United States Patent [19]

Hisada

[11] 3,834,231

[45] Sept. 10, 1974

[54] FLEXIBLE DIAPHRAGMS FOR GAS METER

[75] Inventor: Hachiro Hisada, Tokyo, Japan

[73] Assignee: Tokyo Toyo Rubber Industry Co., Ltd., Tokyo, Japan

[22] Filed: Apr. 17, 1973

[21] Appl. No.: 351,842

[52] U.S. Cl. .............................................. 73/279
[51] Int. Cl. ............................................. G01f 1/00
[58] Field of Search ...... 73/279, 269; 92/96, 103 R, 92/103 SD

[56] References Cited
UNITED STATES PATENTS

| | | | |
|---|---|---|---|
| 1,914,600 | 6/1933 | Hewitt | 92/103 R |
| 3,659,448 | 5/1972 | Schaus | 73/279 |

Primary Examiner—Jerry W. Myracle
Attorney, Agent, or Firm—Woodhams, Blanchard and Flynn

[57] ABSTRACT

This invention relates to flexible diaphragms for gas meters used generally for measurement of gas consumption, and a method of producing such diaphragms. More particularly, the invention relates to diaphragms having sufficient flexibility and airtightness so that they are suitable for use as a key component member in a gas measuring device such as for example a gas meter for measuring the amount consumed of household combustion gas, and a method of producing such diaphragms.

10 Claims, 14 Drawing Figures

GRAPH I

GRAPH II

FLEXIBLE DIAPHRAGMS FOR GAS METER

BACKGROUND OF THE INVENTION

In the past, the flexible diaphragms used as a component member in a gas meter have been produced by suitably shaping and working sheepskins, oil-proof rubber membranes or oil-proof rubber-coated fabrics. Presently, however, the sheep-skin-made diaphragms are being rapidly supplanted by rubber-made ones because it is becoming more and more difficult to obtain sheepskins due to sharply increased demand of such sheepskins in recent years and also because the diaphragms formed from such sheepskins lack homogeneity, involving a high possibility of causing errors in measurements. On the other hand, the diaphragms made from rubber membranes or rubber-coated fabrics have the problem of poor productivity and high manufacturing costs because manufacture of such diaphragms involves the troublesome and time-consuming steps of placing a thin unvulcanized rubber membrane or rubber-coated fabric between a concave female die and a convex male die and then applying high pressure to said both dies with a heated press so as to fix both said dies in position and practice the shaping under heat. Also, since the rubber membrane or rubber-coated fabric is strongly compressed during shaping by the male and female dies, the resultant diaphragm would be deprived of its important instrinsic characteristics, resulting in an article with unsatisfactory strength and hence low durability of the gas meter employing such diaphragm. Further, the diaphragms made from such rubber membrane or rubber-coated fabric would often fail to give a precise measurement owing to configurational troubles or impropriety resulting from their producing methods.

A typical example of such conventional diaphragms made from rubber membranes or rubber-coated fabrics, as shown in FIGS. 1 and 2, comprises a top portion 2, a peripherally spread out slant wall 3 surrounding said top portion 2, and a flange portion 4 surrounding said slant wall 3 and having integrally fastened thereto a gasket 5. This diaphragm 1, however, has a vital defect that when the gasket 5 is securely fixed to the flange portion 4 under pressure and heating, the rubber material composing the gasket 5 would be forced to flow out toward the slant wall 3 to produce a so-called swelling 6 that becomes a great hindrance to proper functioning of the device.

A closer discussion is made below in this connection with reference to FIG. 3. The diaphragm for a gas meter is fastened to a suitable gas meter actuator assembly. This actuator assembly is composed of a pair of meter pans 7, 7', and the flange portion 4 and gasket 5 of the diaphragm 1 are clamped between the opposed edges 8, 8' of said meter pans 7, 7', but the top portion 2 and slant wall 3 of the diaphragm are left free to allow them to quickly respond to variation of pressure applied thereto. The diaphragm 1 is bent at the boundary section 9 to make both a movement in the direction where it assumes the original or shaped configuration (such movement being hereinafter referred to as forward movement, which is a upward movement in the drawing) and a movement in the direction where the diaphragm takes a reversed configuration, that is, a configuration just contrary to the original configuration (such movement being hereinafter referred to as reverse movement, a downward movement in the drawing), and said both movements are repeated alternately to thereby measure gas flow.

Now, suppose a swelling 6 was produced at the boundary 9 between the slant wall 3 and flange portion 4 of the diaphragm 1, then the design bend axis 10 of said diaphragm 1 will be obliged to move to the position of 10'. Therefore, when measuring gas through alternate and repetitive forward and reverse movements of the diaphragm 1, said diaphragm won't move sufficiently until it is closely contacted against the inner walls 11, 11' of the actuator means 7, 7', and hence spaces 12, 12' are formed between said inner walls 11, 11' and the diaphragm. Generally, the flow of rubber material composing the gasket 5 creates a non-uniform swelling 6 between the slant wall 3 and flange portion 4 of the diaphragm 1, so that said spaces 12, 12' are varied in volume from each other in the respective meter pans 7, 7', resulting in producing a large error in measurement. Such error is further enlarged as the diaphragm wears with age. If no such swelling 6 is produced at the boundary 9 between the slant wall 3 and flange portion 4 or gasket 5 of the diaphragm 1, the slant wall 3 of the diaphragm 1 is allowed to stick fast against the inner walls 11, 11' of the meter pans 7, 7' and hence the spaces of different volumes are not formed between said inner walls 11, 11' and the diaphragm 1 when the latter makes alternate forward movement and reverse movement (the latter indicated by dash-dotted line) as shown in FIG. 4. Therefore, no error in measurement is caused by such spaces during measurement of gas flow through alternate and repetitive forward and reverse movements of the diaphragm 1.

Thus, in this type of diaphragms, it is an essential requirement for obtaining a high precision gas meter that the diaphragm used therefor does not permit any flow and swelling of rubber material that composes the gasket. It is however extremely difficult to produce a diaphragm free from such gasket swelling with the conventional techniques of integrally joining the gasket to the flange portion of the diaphragm simultaneously with heating and shaping of the diaphragm, and so far, there is known neither a diaphragm free of such swelling nor a technique for producing such diaphragm. In order to obtain a diaphragm free of any gasket swelling, if the flange portion of the diaphragm is clamped between the edges of the meter pans without interposition of a gasket, a suitable sealant other than a gasket is required. But it is most difficult to perfectly seal the flange portion of the diaphragm with any available sealant of this type, and further, the sealing effect of such sealant declines gradually in use. Also, in order to avoid swelling of the gasket, if a gasket separate from the diaphragm is bonded to the flange portion of the diaphragm and these are clamped at the edges of the meter pans, without said gasket being joined at the time of shaping of the diaphagm, it is indeed possible to prevent occurrence of any measurement error such as caused when using a diaphragm having a swelling, but great difficulty is encountered in positioning the separate diaphragm and gasket correctly relative to each other in perfect agreement to the specified dimensional regulations and then holding them at the edges of the meter pans, and thus it is most difficult to accomplish accurate assemblage.

SUMMARY OF THE INVENTION

The present invention is intended to provide a flexible diaphragm for gas meters which is free of the above-said and other defects and troubles arising from the composing materials, producing methods and constructions of the conventional diaphragms for gas meters, and a method for producing such improved flexible diaphragm.

A first object of the present invention, therefore, is to provide a flexible diaphragm for gas meters which permits measurement of gas at high precision, characterized by using a diaphragm forming membrane made from a cloth or fabric which has been woven or knitted from fibers of synthetic resin having relatively high heat shrinkability, such as for example polyamide known by the name of nylon or polyester known by the trade name of Tetoron, and which has been coated on its one or both sides with an elastomer to make the membrane impermeable to gas.

It is another object of the present invention to provide a flexible diaphragm for gas meters by using the above-said diaphragm forming membrane, characterized in that said diaphragm consists of a flat top portion which may be square, hexagonal, octagonal, circular, oval or of any other suitable configuration, a peripherally spread-out slant wall surrounding said top portion, and a flange portion enclosing said slant wall, and wherein a gasket made of an elastomer is provided on at least one side of said flange portion.

It is still another object of the present invention to provide a flexible diaphragm for gas meters characterized by use of the above-said diaphragm forming membrane and by the above-described construction, wherein no swelling of the gasket-composing elastomer is produced at the boundary between the slant wall and the flange portion or gasket.

It is yet another object of the present invention to provide a flexible diaphragm for gas meters produced by using the above-said diaphragm forming membrane and having the above-described construction, and further characterized in that a portion, close to said slant wall, of said elastomer-made gasket provided on said flange portion is not bonded to said flange portion but is left free.

It is a further object of the present invention to provide a flexble diaphragm for gas meters characterized by use of the above-said diaphragm forming membrane and by the above-described construction, wherein said gasket is formed from at least two portions, that is, a thick-walled portion and thin-walled portion, said thin-walled portion being positioned closer to said slant wall and said thin-walled portion being not secured to said flanged portion but left free therefrom.

Yet another object of the present invention is to provide a method of producing a flexible diaphragm for gas meter having the above-described characteristic construction by using the above-said diaphragm forming membrane, characterized by using a pair of die means arranged such that the top portion and the peripherally spread-out slant wall portion surrounding the first-said portion will be shaped only by the convex male die and hence they are not clamped by said die means, and further characterized in that said diaphragm forming membrane fixed in position by said die means is subjected to heat treatment to induce thermal shrinkage of the synthetic fiber fabric of said diaphragm forming membrane and to shape said top and slant wall portions in conformance to the convexity of said convex die, while simultaneously curing the elastomer covering one or both sides of said diaphragm forming membrane.

An additional object of the present invention is to provide a method of producing a flexible diaphragm for gas meters having the above-described construction by use of the above-said diaphragm forming membrane, characterized by using a pair of die means arranged such that the top portion and the peripherally spread-out slant wall portion surrounding the first-said portion are shaped only by the convex die and hence said both portions as well as said part of the flange portion close to said slant wall are not clamped by said die means, and further characterized in that said diaphragm forming membrane fixed in position by said die means is subjected to heat treatment to induce thermal shrinkage of the synthetic fiber fabric of said diaphragm forming membrane and to shape said top and slant wall portions in conformance to the convexity of said convex die means, while simultaneously curing the elastomer covering one or both sides of said diaphragm forming membrane, wherein said part of the flange portion located close to said slant wall, that is, the part not clamped by said pair of die means, is merely attached with said gasket but the other part of said flange portion is integrally joined with said gasket.

DESCRIPTION

Now, the diaphragms and methods of producing same according to the present invention are described in detail by reference to the embodiments shown in FIGS. 5 to 7 and FIG. 11.

Figure 11:
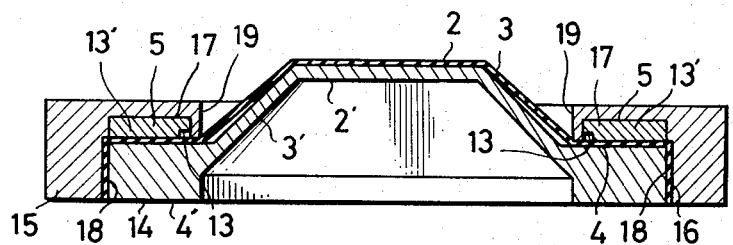
FIG. 11 is a longitudinal sectional view showing a process for producing a diaphragm according to another embodiment of the present invention.

The diaphragm forming membrane M (FIG. 11) used in the present invention is formed from a cloth or fabric woven or knit from fibers having the property that they shrink when heated, such as, for example, polyamide known by the name of nylon or polyester known by the name of Tetoron, one or both sides of said fabric being coated with a highly oil-resistant elastomer such as acrylonitrile butadiene rubber (NBR) to make the fabric gas-impermeable. The diaphragm forming membrane M is cut into a predetermined size and shape and is placed over the surface of the male die 14 as closely as possible as shown in FIG. 11. Then a gasket 5 made of an elastomer is fitted into a recess 17 formed in the female die 15 which is also provided with a hole 18 and a smaller hole 19 for engagement with said male die 14. The male die 14 is fitted in said holes 18 and 19 in the female die 15, and both dies are fastened together by means of, for example, C-clamps and put into an oven and heated. The fabric, which is a principal member of the diaphragm forming membrane M, is shrunk conforming to the configuration of the male die 14 while, at the same time, the elastomer layered on said fabric is cured and the gasket 5 is integrally bonded to the flange portion 4 of the membrane M. After a predetermined time of heating treatment has been completed, the assembly is taken out of the oven and the male and female dies are separated from each other, thereby obtaining a diaphragm 1.

Figure 1:
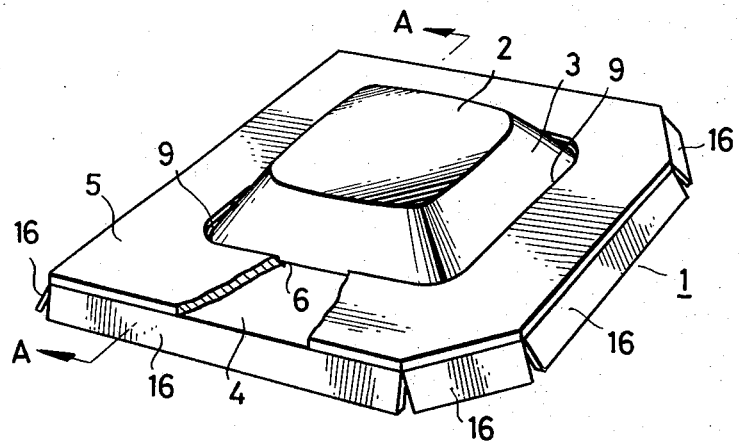
FIG. 1 is a perspective view, with parts broken away, of a conventional flexible diaphragm for a gas meter.
Figure 2:
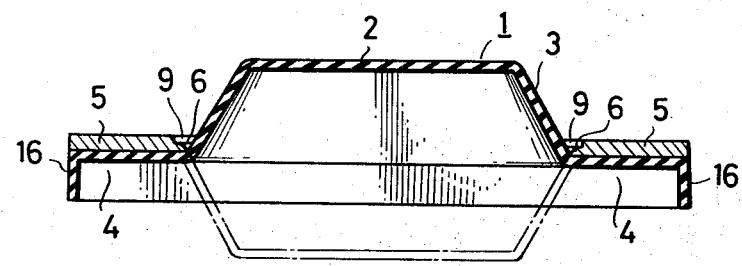
FIG. 2 is a sectional view taken along the line A—A of FIG. 1.
Figure 3:
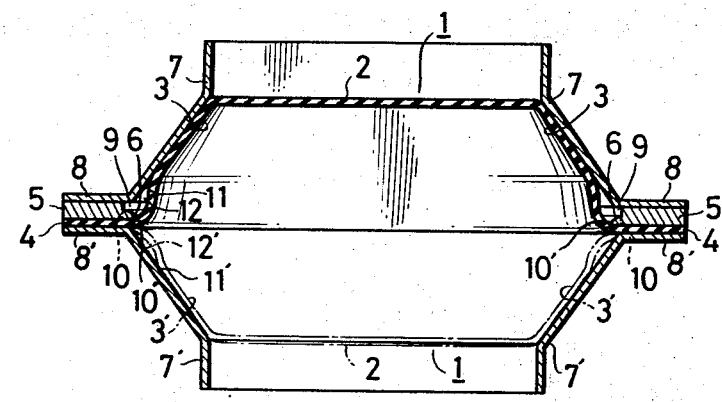
FIG. 3 is a partly cut-away longitudinal sectional view showing a condition where the conventional diaphragm shown in FIGS. 1 and 2 is mounted in gas meter actuator means.
Figure 5:
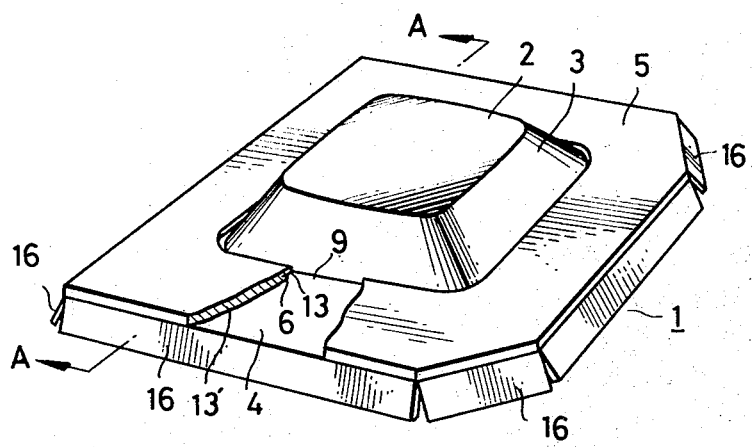
FIG. 5 is a perspective view, with part broken away, of a diaphragm according to an embodiment of the present invention.
Figure 6:
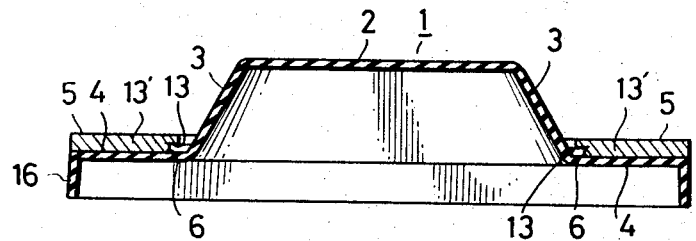
FIG. 6 is a sectional view taken along the line A—A of FIG. 5.
Figure 8:
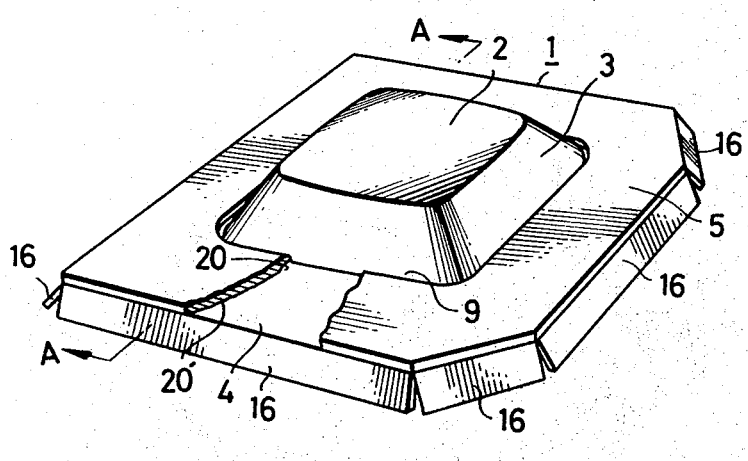
FIG. 8 is a perspective view, with parts broken away, of a diaphragm according to another embodiment of the present invention.

The above-described diaphragm and method of producing same are now described in greater detail (FIG. 11). Said diaphragm forming membrane M, which has been cut to a predetermined size, is spread over the surface of the metal male die 14 having a top portion 2', a slant wall 3' and a flange portion 4' such that said membrane contacts as closely with said die surface as possible. Then the top portion 2' and slant wall 3' of said male die 14 covered with the diaphragm forming membrane M are fitted into the receiving holes 18 and 19 in the female die 15 which has contained in its recess 17 a half-vulcanized gasket 5 shaped by using another set of dies, such that the gasket 5 in the recess 17 in said female die 15 will abut against a predetermined position on the flange portion 4'. In this condition, the peripheral edge 16 of the diaphragm forming membrane M cut into a predetermined shape is interposed between the vertical outer wall of the male die 14 and the corresponding vertical inner wall of the female die 15, and both male and female dies 14 and 15 are kept fastened to each other at one end by a suitable means such as a C-clamp until the heat shaping of the diaphragm is completed. The dies of this condition are then placed in the hot atmosphere heated to about 150°C in an oven where the dies are heated for about 30 to 60 minutes to let the fabric of the diaphragm forming membrane M undergo a thermal shrinkage while, at the same time, inducing a vulcanization reaction in the elastomer layered on one or both sides of said membrane M, and thereafter the die assembly is taken out of the oven and unfastened to disengage the male and female dies, thereby obtaining a finished diaphragm. In the course of this heating treatment and concomitant reactions, the diaphragm forming membrane M is shaped in conformance to the configurations of the top portion 2', slant wall 3', flange portion 4' and peripheral edge 16 of the male die 14 and fixed in that condition by the elastomer which has undergone a vulcanization reaction, while the gasket 5 made of the elastomer, which has been in a half-vulcanized condition before the heating treatment, is now perfectly vulcanized and bonded fast to the surface of the flange portion 4 of the diaphragm 1. The edge piece 16 at the extreme periphery of the diaphragm 1 serves as a grip or catch to facilitate proper positioning when fixing the diaphragm in position in the gas meter actuator means. Usually, this peripheral edge piece 16 is cut at four corners after shaping of the diaphragm as shown in FIGS. 1, 5 and 8, and in fitting the diaphragm in said meter pans 7, 7', the operator holds these cut sections with his fingers and interposes them as prescribed between both edges 8, 8' of said paired meter pans 7, 7', and then the separate sections of said edge piece 16 are cut away. Thereafter, the opposed edges 8, 8' of the meter pans 7, 7' are fixed relative to each other by a suitable clamping means and the parts are assembled into a gas meter for practical use.

Figure 4:
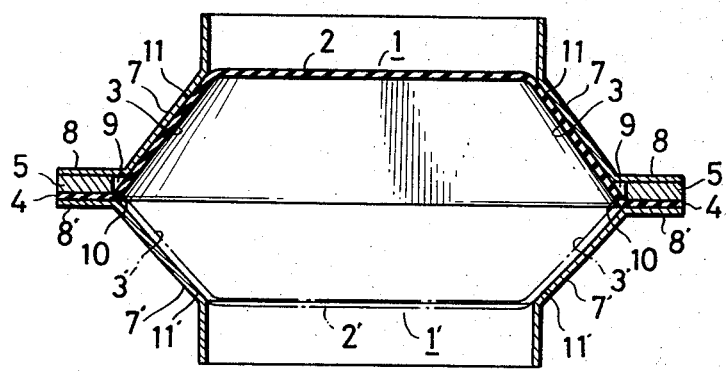
FIG. 4 is a partly cut-away longitudinal sectional view showing a condition where an ideal diaphragm was installed on the meter pans of the gas meter.
Figure 7:
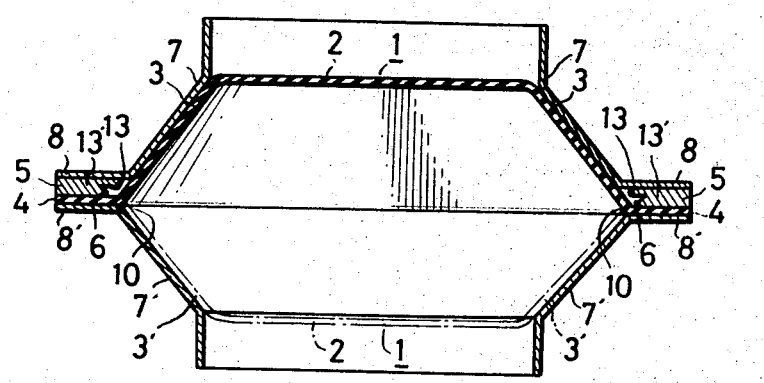
FIG. 7 is a partly cut-away longitudinal sectional view showing a condition where the diaphragm shown in FIGS. 5 and 6 is mounted on the meter pans of the gas meter.

A specific feature in the diaphragm and the method of producing same in the instant embodiment is that a part, close to the slant wall 3, of the gasket 5 attached on the flange portion 4 of the diaphragm forming membrane M is thinner in wall thickness than the other part to form a thin-walled portion 13 so that during the diaphragm shaping under heating, although the gasket 5 is securely bonded to the flange portion 4, said thin-walled portion 13 is not contacted with but spaced apart from the flange portion 4. When the diaphragm 1 is fixed in position in the meter pans, the thin-walled portion 13 of the gasket 5 is clamped by the opposed edges of a pair of meter pans 7, 7' in the same manner as the other thick-walled portion 13' as shown in FIG. 7. Although the drawing is depicted exaggeratedly as if there exists a visible space between the thin-walled portion 13 and the flange portion 4, actually such space disappears to produce the same functional effect as the diaphragm shown in FIG. 4. Thus, the design bend axis 10 of the diaphragm 1 is not at all affected by the gasket 5 clamped by the opposed edges 8, 8' of a pair of meter pans 7, 7' and remains at its design position even after installation. Therefore, no space is formed between the diaphragm and the inner walls of the meter pans 7, 7' during repeated and alternate forward and reverse movements of the diaphragm, and also there comes out no factor that could cause error in measurement in use. According to the diaphragm of this embodiment, even if a flow of gasket-composing elastomer should be caused during the heat shaping process to produce a swelling 6 from the thick-walled portion 13' at a part close to the thick-walled portion between the thin-walled portion 13 and the flange portion 4, such swelling is absorbed up between the thin-walled portion 13 and the flange portion 4 since the gasket 5 is compressedly clamped by the edges 8, 8', and hence actually no swelling from the gasket 5 is caused toward the slant wall 3.

Figure 9:
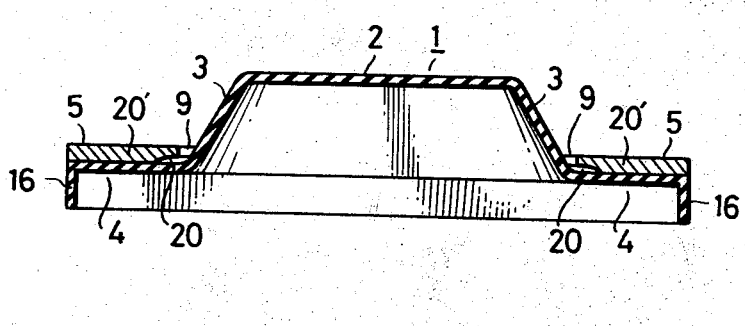
FIG. 9 is a sectional view taken along the line A—A of FIG. 8.
Figure 14:
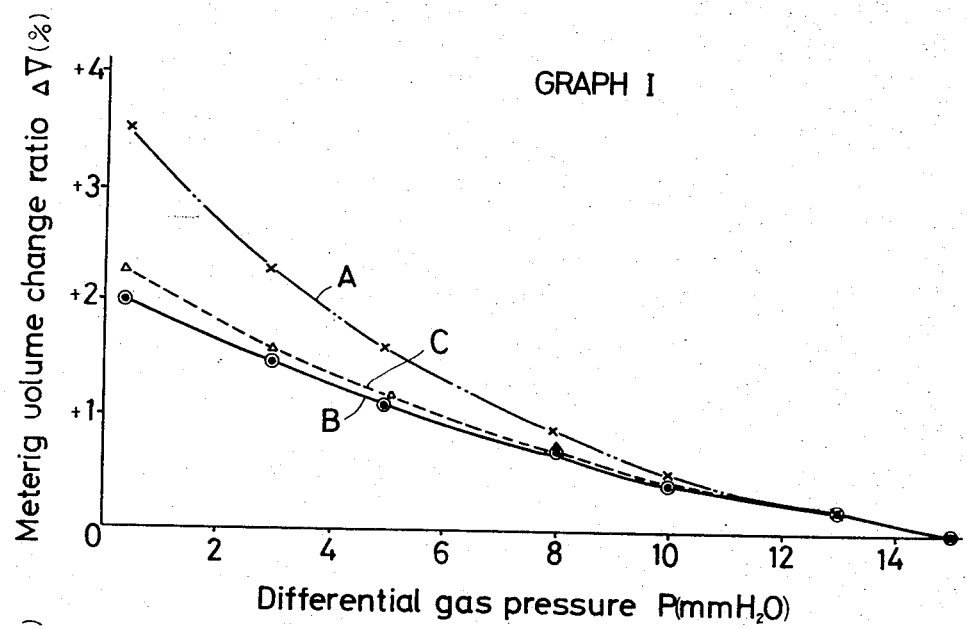
FIG. 14 is a graph for explaining the performance of the diaphragm of the present invention.
Figure 14:
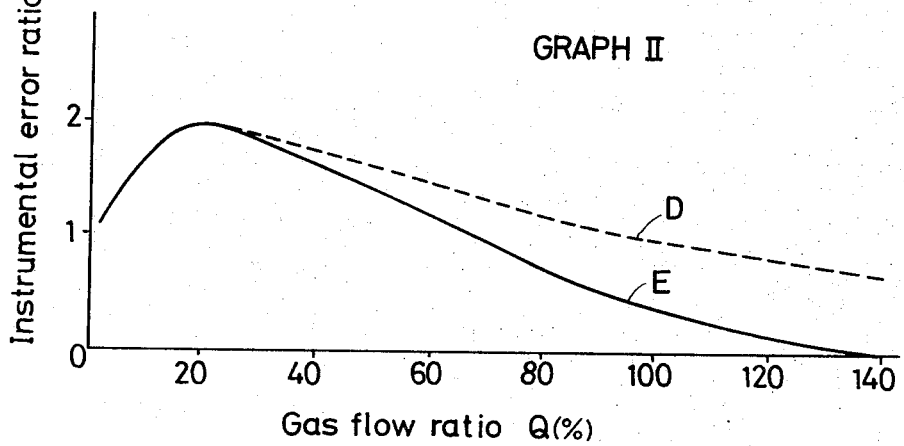

Now, the diaphragm and method of producing same according to another embodiment of the present invention are described with particular reference to FIGS. 8, 9 and 14.

The embodiment shown in FIGS. 8 and 9 is completely identical with the preceding embodiment except for the special arrangement of the gasket 5. The gasket 5 to be bonded to the flange portion 4 is made of an elastomer which has been prepared and cured separately from the shaping of the diaphragm as in the case of the preceding embodiment. In shaping the diaphragm, that part of the gasket 5 which will be positioned close to the slant wall 3 when fitted in a recess 17 in the female die 15 is either left non-applied with adhesive or applied with an easily strippable liquid such as, for example, silicon liquid before setting the diaphragm forming membrane M in the dies, and the other part of the gasket 5 is applied with an adhesive. After taking such steps, the heat shaping is performed by using the male and female dies in the same manner as in the preceding embodiment to thereby obtain a finished diaphragm 1. Although the gasket 5 of the diaphragm 1 obtained by this method is uniform in wall thickness, the end portion 20 close to the slant wall 3 is not fastened to but left free from the flange portion 4, but the other part 20' of the gasket 5 is secured to the flange portion 5 by the adhesive as in the preceding embodiment. However, according to the diaphragm obtained in this embodiment, since the part (20) of the gasket 5 positioned close to the slant wall 3 is applied with a proper measure to keep such part 20 non-attached to the flange portion 4, there is caused absolutely no swelling of elastomer that constitutes the gasket 5, and hence when this diaphragm is adapted to the meter pans of the gas meter, it can produce most ideal practical effects same as explained in connection with FIG. 4.

Figure 12:
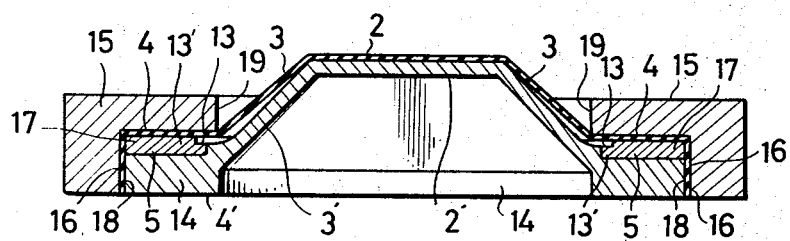
FIG. 12 is a longitudinal sectional view illustrating a process for producing a diaphragm according to still another embodiment of the present invention.

Still another embodiment of the present invention is now described with reference to FIG. 12.

In the previous embodiments, the gasket 5 is bonded to the surface of the flange portion 4, that is, on the side where the top portion 2 and slant wall 3 are provided, but, in the instant embodiment, a gasket 5 of the same configuration as shown in FIGS. 5 to 7 and 11, that is, having a thin-walled portion 13 and a thick-walled portion 13', is attached to the underside of the flange portion 4. The diaphragm of this arrangement, when installed on the meter pan of the gas meter, also demonstrates as excellent working performance as that of FIG. 7.

Figure 13:
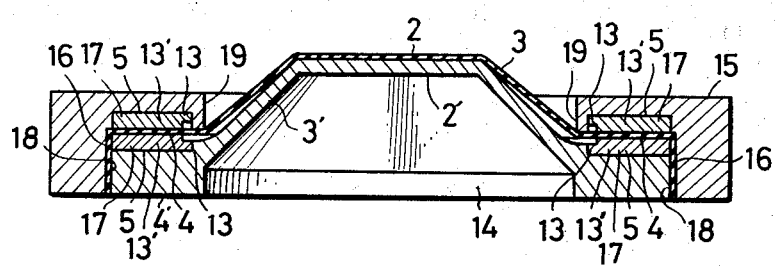
FIG. 13 is a longitudinal sectional view illustrating a process for producing a diaphragm according to yet another embodiment of the present invention.

Reference is now made to FIG. 13 where a further embodiment of the present invention is shown.

According to this embodiment, similar gaskets 5 are fastened both to the surface of the flange portion 4, where the top portion 2 and slant wall 3 are provided, and also to the underside of said flange portion. When fitted in the gas meter actuator means and used for measurement of gas, this diaphragm also proves as highly effective as the diaphragms in the heretofore described embodiments. Although in the diaphragm of this embodiment each of the gaskets 5 secured to both sides of the flange portion 4 is composed of a thick-walled portion 13' and a thin-walled portion 13, it is possible to make said both gaskets uniform in wall thickness, with their end portions close to the slant wall 3 being unattached to the flange portion as in the embodiment of FIGS. 8 and 9. Such arrangement can also produce an excellent working performance.

Figure 10:
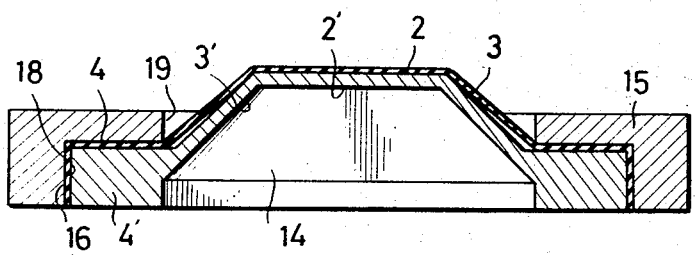
FIG. 10 is a longitudinal sectional view illustrating a process for producing a diaphragm according to the present invention.

The diaphragms and methods of producing same according to the present invention have been described in detail hereinabove by way of some embodiments thereof. In short, the point is that the end portion of the gasket positioned close to the slant wall is separated free from the flange portion so as to preclude occurrence of any hindrance that could become a factor of producing a space between the diaphragm and the inner walls of the meter pans, thereby allowing repetitive alternate and uniform forward and reverse movements of the diaphragm along the inner walls of the meter pans of the gas meter. And the diaphragms having such characteristic construction can only be realized by the basic techniques in the proposed method of the present invention. The basic techniques embodied in the method of the present invention comprise the following features: that the male and female dies 14 and 15 are arranged such that, as shown in FIG. 10, the top portion 2 and slant wall 3 of the diaphragm will be shaped merely by the convex male die 14 and hence the corresponding portions of the disphragm forming membrane M are not compressedly clamped during shaping of the diaphragm, and that said diaphragm forming membrane fitted in said both male and female dies 14 and 15 is subjected to heat treatment to induce thermal shrinkage of synthetic fibers composing said membrane in conformance to the top portion 2 and slant wall 3 of said male die 14, while, at the same time, curing the elastomer that constitutes said diaphragm forming membrane M, such that thermal deformation of said synthetic fibers will be made ever more invariable or permanent by curing of said elastomer. These novel techniques have realized marked improvement of durability of the diaphragm without sacrificing any of the intrinsic properties of the diaphragm forming membrane and have also made it possible to perform shaping by keeping free the end portion of the gasket located close to the slant wall, that is, without attaching said end portion to the flange portion of the membrane, which is another salient feature of the present invention, and, as a result, there is obtained a diaphragm that produces very excellent effects when used in a gas meter.

The term "elastomer" as used in the present specification refers to a material, such as natural rubber, synthetic rubber or like, which is capable, particularly when used as composing material of diaphragm forming membrane, of making the woven or knitted fabric impermeable to fluids and also of making the diaphragm mobile so as to let it take any suitable position corresponding to variation of pressure applied thereto.

Now, the performances of the diaphragms of the present invention in practical use are discussed in comparison with those of the conventional diaphragms with reference to FIG. 14 where the errors in measurement as observed in measuring gas by using gas meters adapted with a diaphragm of the present invention and a conventional one, respectively, are graphically shown. Referring first to Graph I, it is noted that in the gas meter using a conventional diaphragm, when the diaphragm makes a forward movement, the metering volume change ratio $\Delta V(\%)$ to the differential gas pressure P (mmH$_2$O) of the supplied gas describes a cure shown by a dash-dotted line (A), while when the diaphragm makes a reverse movement in the same gas meter, such $\Delta V$ to P describes a curve shown by a solid line (B). As far as the reverse movement of the diaphragm is concerned, both the conventional diaphragm and the diaphragm of the present invention make such movement under substantially equal conditions, so that the $\Delta V$ to P curve in the diaphragm of the present invention coincides with the curve shown by the solid line (A). On the other hand, in the gas meter using a diaphragm according to the present invention, when the diaphragm makes a forward movement, the metering volume change ratio $\Delta V(\%)$ to the differential gas pressure P ($mmH_2O$) of gas supplied describes a curve shown by a dash line (C).

As apparent from the foregoing, in the gas meter employing a conventional diaphragm, there is created a difference in the metering volume change ratio $\Delta V$ to the differential gas pressure P of the gas supplied, of an amount equivalent to the distance between the dash-dotted line (A) and the solid line (B), between when the diaphragm makes a forward movement and when it makes a reverse movement. More specifically, in case the differential gas pressure is for instance 2 $mmH_2O$, there takes place about 1.65 percent of volume change when the diaphragm makes a reverse movement, while such volume change is about 2.54 percent when the diaphragm makes a forward movement. On the other hand, in the gas meter adopting a diaphragm of the present invention, when the diaphragm makes a reverse movement, there is produced about 1.65 percent volume change, same as in the case of the conventional diaphragm for the aforesaid reason, but when it makes a forward movement, such volume change is about 1.8 percent.

In the gas meter, gas is measured by repetitive and alternate forward and reverse movements of the diaphragm. In the case of the conventional diaphragm tested, there is produced a difference of about 0.89 percent in volume change ratio between the forward and reverse movements, and such difference is bound to be further increased as the differential pressure of gas supplied is reduced. This is held responsible for operational change of the gas meter in use and consequent errors in measurement. In comparison with this, in the gas meter using a diaphragm of the present invention, such difference is as small as about 0.15 percent, and further it remains small even if gas pressure is reduced. These facts testify far excellence in performance of the diaphragms of the present invention over the conventional ones.

Referring to Graph II, there is shown the instrumental error ratio $E(\%)$ to gas flow ratio $Q(\%)$, as ocserved in the gas meters using a diaphragm of the present invention and a conventional one, respectively. The dotted line D was obtained by employing a gas meter using a diaphragm of the conventional one, while the solid line E was obtained by employing a diaphragm of the present invention. As noted from this graph, in the gas meter using a diaphragm of the present invention, the instrumental error ratio caused by the gas meter is diminished to one half compared to the case of the conventional diaphragm at 100 percent. This shows that the gas meter provided with the diaphragm according to the present invention can make stable measurements at respective flow ratios.

What is claimed is:

1. In a gas meter, a flexible diaphragm having a top wall, a peripheral inclined side wall extending from the periphery of the top wall and flaring in a direction away from said top wall and a peripheral flange extending outwardly from the opposite end of the side wall, said diaphragm having at least one elastomeric gasket secured to one side of said flange, the improvement which comprises:

said diaphragm is made of a heat-shrunk fabric of synthetic resin fibers, said fabric being coated on one or both of its sides with a gas-impermeable elastomeric layer, the inner edge portion of said gasket adjacent said side wall of said diaphragm being free from attachment to said flange.

2. A flexible diaphragm as defined in claim 1, in which said fibers are heat-shrinkable nylon fibers or polyester fibers.

3. A flexible diaphragm as defined in claim 1, in which said elastomer layer is vulcanized acrylonitrile-butadiene rubber.

4. A flexible diaphragm as defined in claim 1, in which said gasket is secured to said flange by being vulcanized thereto.

5. A flexible diaphragm as defined in claim 1, in which said gasket is secured to said flange by an adhesive.

6. In a gas meter, a flexible diaphragm having a top wall, a peripheral inclined side wall extending from the periphery of the top wall and flaring in a direction away from said top wall and a peripheral flange extending outwardly from the opposite end of the side wall, said diaphragm having at least one elastomeric gasket secured to one side of said flange, the improvement which comprises:

said diaphragm is made of a heat-shrunk fabric of synthetic resin fibers, said fabric being coated on one or both of its sides with a gas-impermeable elastomeric layer, said gasket comprising an inner portion adjacent said side wall of said diaphragm and an outer portion remote from said side wall, said inner portion being of lesser thickness than said outer portion, said inner portion being free from attachment to said flange and said outer portion being fixedly secured to said flange.

7. A flexible diaphragm as defined in claim 6, in which said gasket is secured to the upper side of said flange.

8. A flexible diaphragm as defined in claim 6, in which said gasket is secured to the lower side of said flange.

9. A flexible diaphragm as defined in claim 6, in which separate gaskets are secured to the upper and lower sides of said flange.

10. A flexible diaphragm as defined in claim 6, in which said fibers are heat-shrinkable nylon fibers or polyester fibers.

* * * * *